US006123311A

United States Patent [19]

Trinier

[11] Patent Number: 6,123,311

[45] Date of Patent: Sep. 26, 2000

[54] BASE ASSEMBLY FOR MAINTAINING ELONGATED SUPPORT UPRIGHT

[76] Inventor: Paul Edward Trinier, 44 Banner Crescent, Ajax, Ontario, Canada, L1S 3S9

[21] Appl. No.: 09/006,885

[22] Filed: Jan. 14, 1998

[30] Foreign Application Priority Data

Jan. 17, 1997 [CA] Canada .................................. 2195367

[51] Int. Cl.[7] ..................................................... F16M 13/00

[52] U.S. Cl. ........................ 248/530; 248/188.7; 248/167

[58] Field of Search ................................ 248/530, 188.7, 248/523, 156, 519, 528, 529, 167; 211/168; 108/156

[56] References Cited

U.S. PATENT DOCUMENTS

| | | | |
|---|---|---|---|
| 1,508,470 | 9/1924 | Partmann | 248/167 |
| 2,923,513 | 2/1960 | Johnson | 248/188.7 |
| 3,078,063 | 2/1963 | Frankl | 248/188.7 |
| 3,477,671 | 11/1969 | Goodridge | 248/188.7 |
| 3,908,946 | 9/1975 | George et al. | 248/188.7 |
| 4,448,378 | 5/1984 | Binfare' | 248/188.7 |
| 4,728,067 | 3/1988 | Steinmetzer et al. | 248/188.7 |

*Primary Examiner*—Leslie A. Braun
*Assistant Examiner*—Kimberly Wood

[57] ABSTRACT

The base assembly is removably received in a hollow end portion of a column which is used to support such things as handles of umbrellas, flag poles or legs of chairs and tables. The assembly includes a plug which is received in the end portion and which has a number of longitudinally extending cavities formed in it. The upper portions of a number of legs are received in the cavities and a plate is bolted to the plug for holding the leg portions in place. Instead of a plug the assembly can have upper and lower plates which are spaced apart from one another. The upper leg portions are received in openings in the plates and are held in place by means of a leg-retaining plate which is bolted to the first two plates.

3 Claims, 3 Drawing Sheets

BASE ASSEMBLY FOR MAINTAINING ELONGATED SUPPORT UPRIGHT

BACKGROUND OF THE INVENTION

This invention relates to an assembly for maintaining elongated supporting elements upright. More particularly the invention relates to an assembly which may be dismantled for carrying and assembled for use and which supports supporting elements such as handles of umbrellas, flag poles or legs of chairs and tables.

Assemblies for supporting elongated vertical elements such as legs of tables, chairs, stools and display stands are known and are described in a number of patents of the United States. Examples of such patents are the following: U.S. Pat. No. 2,815,801 to Fingerhut et al; U.S. Pat. No. 2,210,047 to Stieglitz; U.S. Pat. No. 3,645,404 to Hansen; U.S. Pat. No. 3,801,054 to Glowacki; U.S. Pat. No. 4,448,378 to Binfare; U.S. Pat. No. 4,728,067 to Steinmetzer et al; and U.S. Pat. No. 1,856,805 to Call.

The assemblies such as those described in the patents listed above have a number of shortcomings. Some cannot be easily taken apart for carrying. Others are not suitable for use where the surface on which they are seated is not level or is soft. Still others have components which are complicated of manufacture and hence are quite expensive.

SUMMARY OF THE INVENTION

The assembly of the invention may be easily dismantled for carrying and assembled for use. The assembly is suitable for supporting elements such as handles of umbrellas, flag poles or legs of chairs and tables and it may be placed on uneven ground or sand. Moreover the assembly is made up of components which may be readily and cheaply manufactured.

The invention may be broadly described, according to one of its aspects, as a base assembly for supporting a vertical column having a hollow lower end portion. The assembly comprises a plug which is removably receivable in the lower end portion and which has a plurality of longitudinally extending cavities formed therein. The assembly includes a plurality of legs each having an upper portion receivable in a separate cavity; and means for removably securing the legs in the cavities.

The assembly according to another aspect of the invention includes a base assembly for supporting a vertical column having a hollow lower end portion. The assembly comprises upper and lower plates removably receivable in the lower end portion; a stud which extends through a first opening formed in the upper plate, through a first opening formed in the lower plate and downwardly of the second plate. Means is provided for maintaining the plates in a spaced apart relationship. A plurality of legs each having an upper portion are receivable in a second opening formed in the lower and upper plates. A leg-retaining plate has an opening for receipt of an outwardly extending portion of the stud. A portion of each the leg is disposed between the leg-retaining and lower plates. Means is provided for tightening the lower and leg-retaining plates to the leg portions to secure the leg portions to the plug.

DESCRIPTION OF THE DRAWINGS

The base assembly for supporting a vertical column of the invention is described with reference to the accompanying drawings in which.

Like reference characters refer to like parts throughout the description of the drawings.

DESCRIPTION OF PREFERRED EMBODIMENTS

Figure 1:
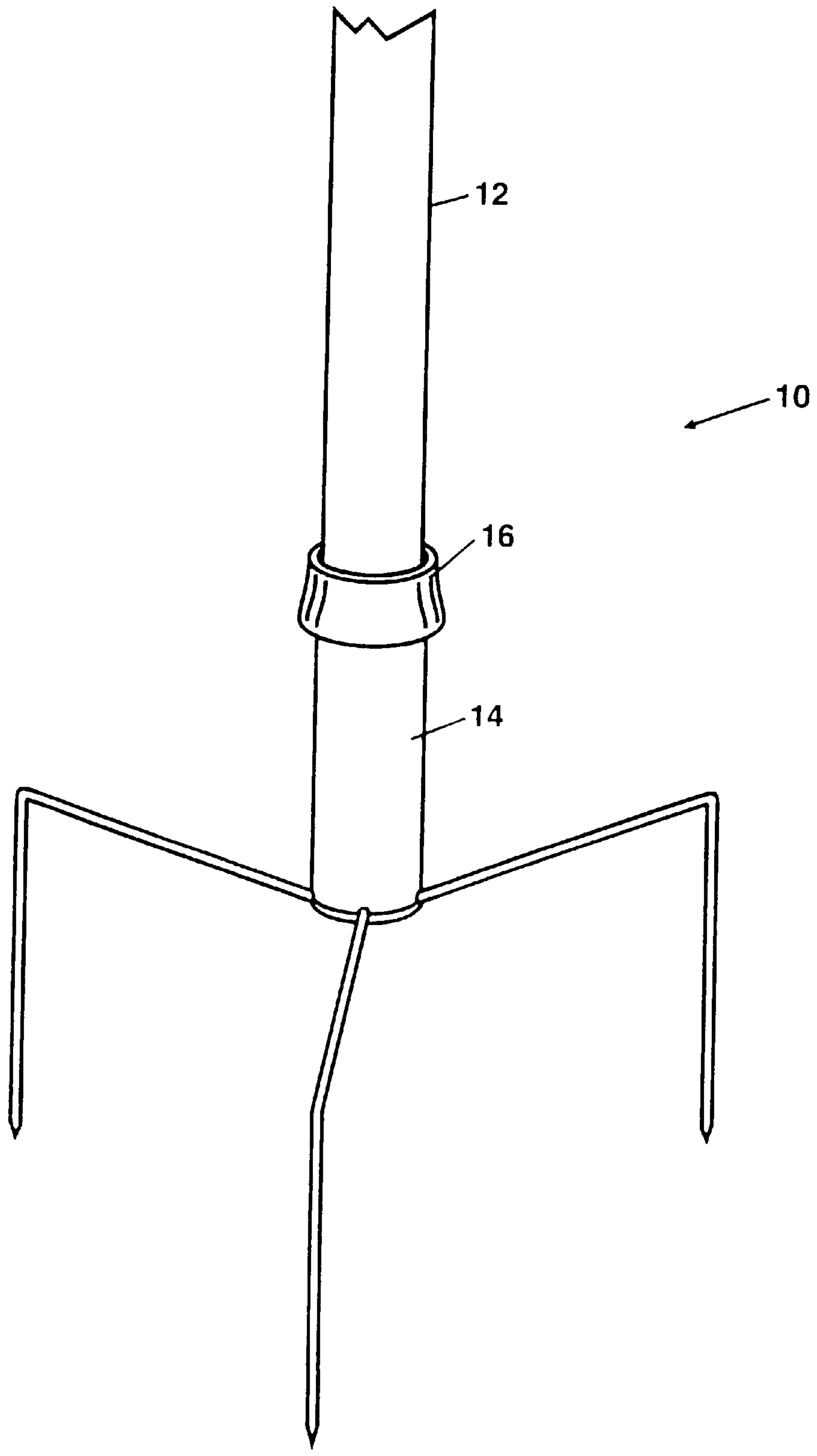
FIG. 1 is a perspective view of the base assembly shown in conjunction with a lower portion of a handle, pole, leg or the like which is supported by the assembly.

With reference to FIG. 1, the base assembly of the invention, generally 10, is shown in conjunction with the lower portion of a handle, pole or leg 12 (collectively referred to as a "rod"). If the rod is a handle, an umbrella may be attached to its upper end and if the rod is a pole, a flag or a net for badminton, tennis or the like may be attached to it. If the rod is a leg, it may be of a table or chair.

The assembly includes a hollow vertical column 14 having an inner diameter greater than the outer diameter of the rod so that the rod is removably accommodated within the column. A conventional collar 16 is provided which, when rotated in one direction, tightens the connection between the rod and the column and prevents the two from being separated and which, when rotated in the opposite direction, loosens the connection and allows the rod to be withdrawn from the column.

With reference to FIGS. 2 to 5, a plug 20 is accommodated within the column. The plug is cylindrical in shape and has a number of parallel longitudinally extending cavities 22 formed in it. One cavity is 22*a* concentric with the longitudinal axis of the plug and the remaining cavities 22*b* are radially outward of the central cavity. A threaded stud 24 is accommodated in the central cavity. A threaded hexagonal nut 26 and a threaded wing nut 28 are threaded to the upper and lower portions, respectively, of the stud which extend outwardly of the plug.

Legs 30 have upper portions 30*a* which are received in the cavities 22*b*. The lower portions 30*b* of the legs have pointed lower ends 30*c* to facilitate the driving of the legs into the ground should that be desirable.

Figure 2:
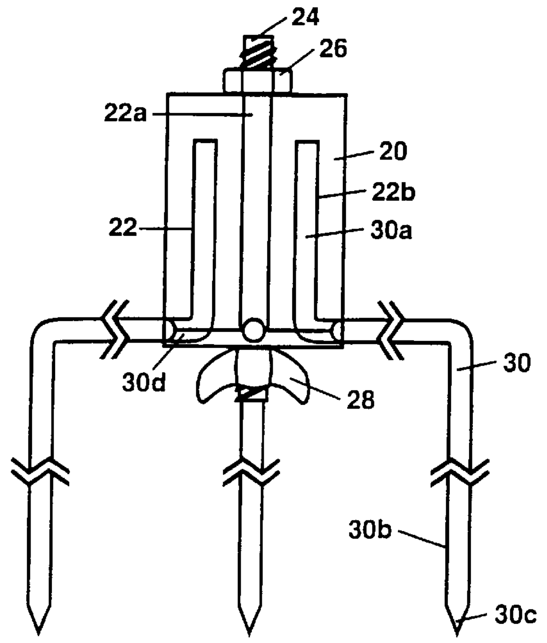
FIG. 2 is an elevation of the base assembly, partly cut away and in enlarged scale.
Figure 3:
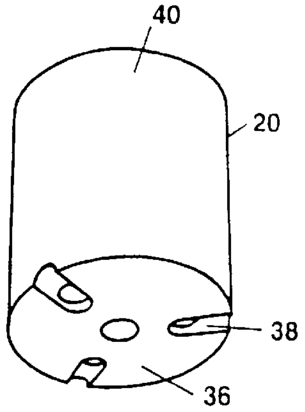
FIG. 3 is a perspective view of a plug which is a part of the assembly.
Figure 4:
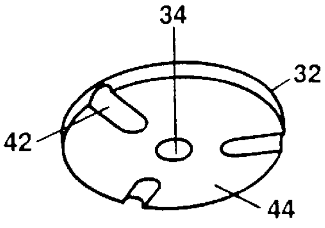
FIG. 4 is a perspective view of a plate which is attached to the plug illustrated in FIG. 3.
Figure 5:
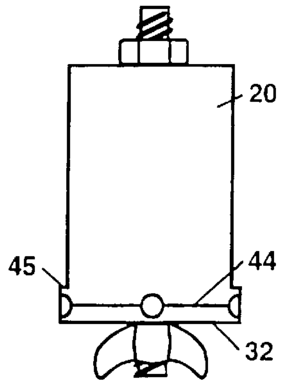
FIG. 5 is an elevation of the plug and plate interconnected by means of a threaded stud.

With reference to FIGS. 4 and 5, a circular leg-retaining plate 32 has a central opening 34 and is attached to the bottom of the plug by means of stud 24. FIG. 4 shows the plate upside down and FIG. 5 shows the plate right side up. As illustrated in FIG. 3, on the lower wall 36 of the plug a number of slots 38 is formed. Each slot extends from an opening of one cavity 22*a* and terminates at the side wall 40 of the plug. Like slots 42 are formed on the face 44 of the plate 32 which contacts the stud. The slots in the plate and plug cooperate with one another to form recesses for receipt of the intermediate portions 30*d* of each leg (FIG. 2).

With reference again to FIG. 2, the legs are attached to the plug by inserting their upper portions 30*a* into cavities 22*b* in the plug and rotating the legs until their intermediate portions are in slots 38. Leg-retaining plate 32 is then attached to the plug by inserting the lower end portion of the stud into the central opening 34 of the plate and rotating the plate until the intermediate portion of each leg is in a separate slot 42 formed in the plate. Wing nut 28 is then tightened in order to cause the plate to bear against the legs.

The diameter of recesses formed by slots 38, 42 is preferably slightly less than the diameter of the intermediate portions of the legs so that the legs are held tightly in the recesses when the wing nut is tightened. The column which is supported by the base assembly of the invention will accordingly not wobble but will be firmly anchored by the assembly.

Figure 6:
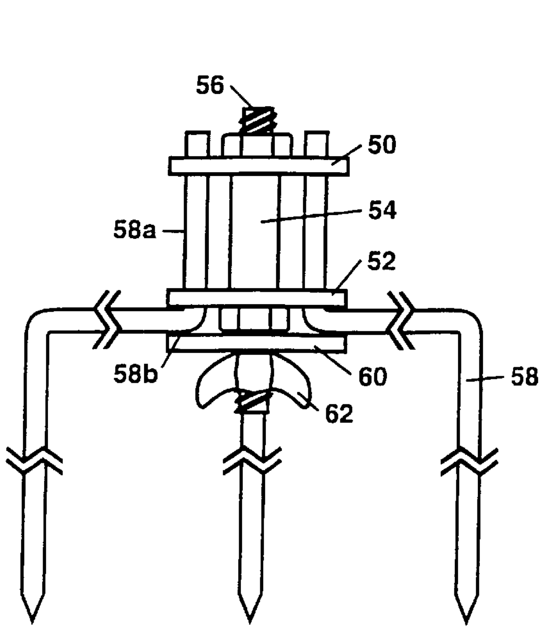
FIG. 6 is an elevation of a second embodiment of the base assembly of the invention.

With reference to FIG. 6, a second embodiment of the base assembly of the invention is illustrated. In that embodiment upper and lower plates 50, 52 are spaced apart by a sleeve 54. A threaded stud 56 passes through that sleeve and through central openings in the two plates.

Openings are formed in plates 50, 52 for the upper portions 58*a* of legs 58. The legs are held in position by means of a leg-retaining plate 60. That plate has a central opening for receipt of stud 56 and tightening of wing nut 62 causes the leg-retaining plate 60 to bear against the intermediate portions 58*b* of the legs. As illustrated in FIG. 6, the leg is in the form of a continuous rod. Its intermediate portion is beneath the lower plate 52 and extends radially outward relative to the longitudinal axis of the stud. The intermediate portion terminates at a ground contacting portion, marked "58" in that Figure.

The lower and upper plates are received in column 14 illustrated in FIG. 1. Preferably the inner diameter of the column is only slightly greater that the diameter of the plates so that the plates do not rock within the column.

Figure 7:
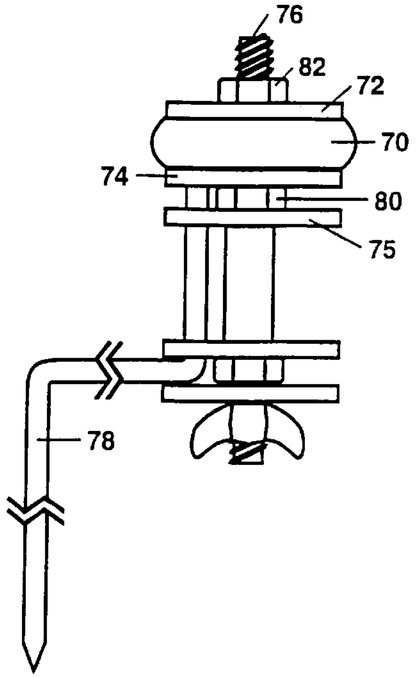
FIG. 7 is an elevation of a portion of the assembly illustrated in FIG. 6 together with a gasket and plates used to maintain the assembly stationary.
Figure 8:
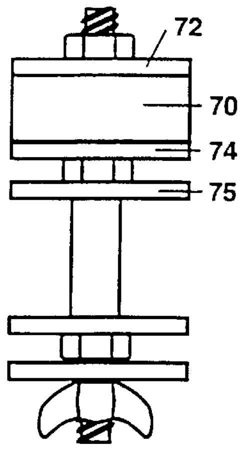
FIG. 8 is an elevation of a portion of the assembly illustrated in FIG. 7.
Figure 9:
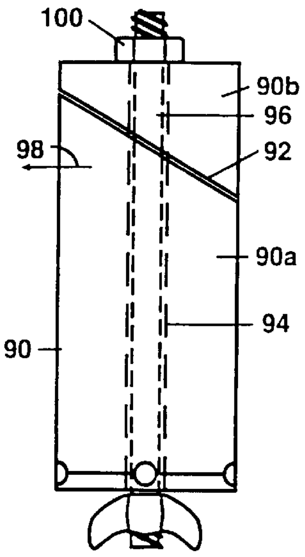
FIG. 9 is an elevation of a second embodiment of the plug illustrated in FIGS. 3 to 5 in conjunction with a plate and threaded stud.

The remaining FIGS. 7 to 9 illustrate two means for securing the assembly tightly within the column. With reference first to FIGS. 7 and 8, a gasket 70 composed of resilient material is sandwiched between compressing elements in the form of upper and lower rings 72, 74. Ring 75 serves the same purpose of ring 50 of FIG. 6.

The gasket and rings 72, 74 are mounted on stud 76. The lower ring 74 rests on the upper walls of legs 78 and hexagonal nut 80. A second hexagonal nut 82 is threaded onto the stud above the upper ring 72.

The gasket is in an undeformed shape in FIG. 8. Tightening of nut 82 serves to squeeze the gasket with resulting radial outward deformation as illustrated in FIG. 7. The more the gasket expands the more pressure it will apply to the inside wall of the column.

In FIG. 9, plug 90 is composed of two segments 90*a*, 90*b* separated by a cut 92 which is offset from the longitudinal axis of the plug. The inner diameter of central opening 94 in the plug is greater than the diameter of stud 96 to permit limited lateral movement, in the direction of arrow 98 by the plug relative to the stud. In all other respects, the plug has the same construction as plug 20 of FIG. 3 and is used in conjunction with leg-retaining plate 32.

Tightening of hexagonal nut 100 serves to cause upper plug segment 90*b* to move downwardly and laterally with respect to the lower segment 90*a* and one or both of those segments will contact the inner wall of the column with greater or lesser pressure depending on the amount that the nut is tightened.

It will be understood of course that modifications can be made in the preferred embodiments illustrated and described herein without departing from the scope and purview of the invention as defined in the appended claims.

What is claimed is:

1. A base assembly for supporting a vertical column having a hollow lower end portion, said assembly comprising: upper and lower plates adapted to be removably received in said lower end portion; a stud having a longitudinal axis and extending through a first opening formed in said upper plate and through a first opening formed in said lower plate and downwardly therefrom; means for maintaining said plates in a spaced apart relationship; a plurality of legs each comprising a rod having an upper portion which extends downwardly through a second opening formed in said upper and lower plates, and which terminates beneath said lower plate at an intermediate portion, said intermediate portion extending radially outwardly relative to the longitudinal axis of said stud and terminating at a lower ground contacting portion; a leg-retaining plate having an opening for receipt of said upper portion of said stud, said intermediate portion of each said leg being disposed between said leg-retaining and lower plates; and means for clamping said intermediate portion between said lower and leg-retaining plates to secure said leg portions to said base assembly.

2. The base assembly as claimed in claim 1 wherein said upper and lower plates each has an outer wall which is adapted to contact an inner wall of said lower end portion.

3. The base assembly as claimed in claim 1, wherein said means for maintaining said plates in a spaced apart relationship comprises a sleeve which surrounds the portion of said stud between said two plates and which is separate and apart from said legs.

* * * * *